(12) United States Patent
Kutergin et al.

(10) Patent No.: US 8,667,214 B2
(45) Date of Patent: Mar. 4, 2014

(54) TECHNIQUES TO STORE CONFIGURATION INFORMATION IN AN OPTION READ-ONLY MEMORY

(71) Applicant: Intel Corporation, Santa Clara, CA (US)

(72) Inventors: Timofey V. Kutergin, Dzerzhinsk (RU); Sergey A. Samylin, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/677,845

(22) Filed: Nov. 15, 2012

(65) Prior Publication Data
US 2013/0073801 A1    Mar. 21, 2013

Related U.S. Application Data

(63) Continuation of application No. 11/377,332, filed on Mar. 15, 2006.

(51) Int. Cl.
*G06F 12/00* (2006.01)

(52) U.S. Cl.
USPC .......................... 711/103; 711/170

(58) Field of Classification Search
USPC ..................... 711/103, 170; 714/36
See application file for complete search history.

(56) References Cited

U.S. PATENT DOCUMENTS

| | | | |
|---|---|---|---|
| 5,845,095 A * | 12/1998 | Reed et al. | 710/104 |
| 5,911,084 A | 6/1999 | Jones et al. | |
| 6,542,955 B1 * | 4/2003 | Chen | 711/102 |
| 6,560,703 B1 | 5/2003 | Goodman | |
| 7,206,970 B1 * | 4/2007 | Lauterbach et al. | 714/36 |
| 2003/0217257 A1 | 11/2003 | Ebsen et al. | |

FOREIGN PATENT DOCUMENTS

| | | |
|---|---|---|
| EP | 1241571 | 9/2002 |
| EP | 1256865 | 11/2002 |

* cited by examiner

*Primary Examiner* — Matthew Bradley
(74) *Attorney, Agent, or Firm* — Kacvinsky Daisak PLLC

(57) ABSTRACT

Method and apparatus to store configuration information in an option read-only memory are described.

20 Claims, 4 Drawing Sheets

TECHNIQUES TO STORE CONFIGURATION INFORMATION IN AN OPTION READ-ONLY MEMORY

RELATED APPLICATION

This application is a continuation application which claims benefit of, and priority to, co-pending U.S. patent application Ser. No. 11/377,332 titled "TECHNIQUES TO STORE CONFIGURATION INFORMATION IN AN OPTION READ-ONLY MEMORY" filed on Mar. 15, 2006, which is a national stage application claiming benefit of and priority to international PCT/RU2004/000280 filed Jul. 16, 2004, the entirety of which is hereby incorporated by reference.

BACKGROUND

Many computer systems may be arranged to operate with a removable device. For example, a personal computer may have a Peripheral Component Interface (PCI) slot to receive a network interface card. The removable device typically includes an option read-only memory (ROM). An option ROM may include embedded control software to assist in configuring the removable device for operation with a particular system. The amount of non-volatile memory available to implement an option ROM, however, may be limited. Consequently, there may be a need for improved techniques in implementing an option ROM for a removable device.

DETAILED DESCRIPTION

Figure 1:
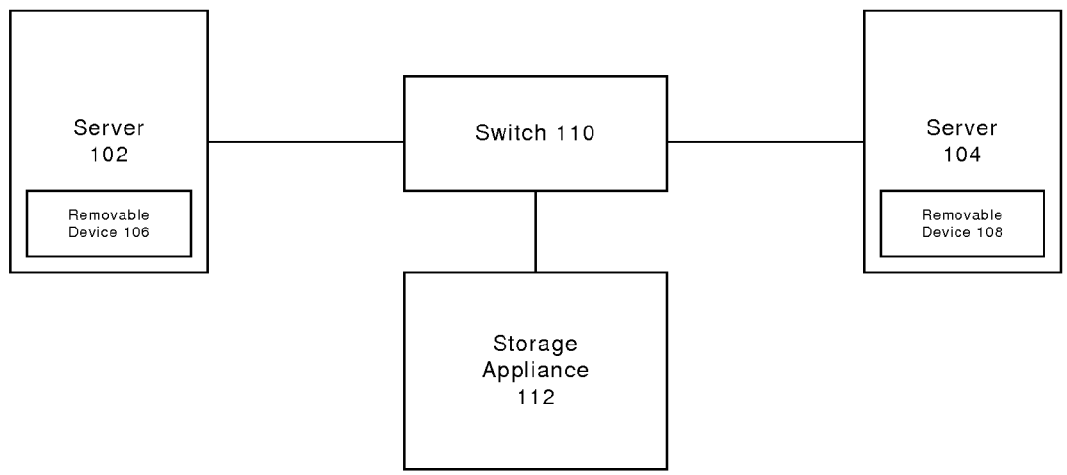
FIG. 1 illustrates a block diagram of a system 100.

FIG. 1 illustrates a block diagram of a system 100. System 100 may comprise, for example, a communication system having multiple nodes. A node may comprise any physical or logical entity having a unique address in system 100. Examples of a node may include, but are not necessarily limited to, a computer, server, workstation, laptop, ultra-laptop, handheld computer, telephone, cellular telephone, personal digital assistant (PDA), router, switch, bridge, hub, gateway, wireless access point (WAP), and so forth. The unique address may comprise, for example, a network address such as an Internet Protocol (IP) address, a device address such as a Media Access Control (MAC) address, and so forth. The embodiments are not limited in this context.

The nodes of system 100 may be connected by one or more types of communications media and input/output (I/O) adapters. The communications media may comprise any media capable of carrying information signals. Examples of communications media may include metal leads, semiconductor material, twisted-pair wire, co-axial cable, fiber optics, radio frequency (RF) spectrum, and so forth. An information signal may refer to a signal which has been coded with information. The I/O adapters may be arranged to operate with any suitable technique for controlling information signals between nodes using a desired set of communications protocols, services or operating procedures. The I/O adapters may also include the appropriate physical connectors to connect the I/O adapters with a corresponding communications media. Examples of an I/O adapter may include a network interface, a network interface card (NIC), a network storage adapter, radio/air interface, disc controllers, video controllers, audio controllers, and so forth. The embodiments are not limited in this context.

The nodes of system 100 may be configured to communicate different types of information, such as media information and control information. Media information may refer to any data representing content meant for a user, such as voice information, video information, audio information, text information, alphanumeric symbols, graphics, images, and so forth. Control information may refer to any data representing commands, instructions or control words meant for an automated system. For example, control information may be used to route media information through a system, or instruct a node to process the media information in a predetermined manner.

The nodes of system 100 may communicate media and control information in accordance with one or more protocols. A protocol may comprise a set of predefined rules or instructions to control how the nodes communicate information between each other. The protocol may be defined by one or more protocol standards as promulgated by a standards organization, such as the Internet Engineering Task Force (IETF), International Telecommunications Union (ITU), the Institute of Electrical and Electronics Engineers (IEEE), and so forth. For example, one embodiment may be arranged to operate in accordance with the Internet Small Computer System Interface (ISCSI), as defined by the IEEE proposed standard Request For Comment (RFC) 3720, April 2004 ("ISCSI Specification"). The embodiments, however, are not limited in this context.

Referring again to FIG. 1, system 100 may comprise, for example, a storage area network (SAN). A SAN may comprise a dedicated network for data storage and retrieval. A SAN may decouple storage devices from their respective servers, and use a SAN fabric to connect any server with any storage subsystem. The SAN fabric may communicate storage traffic between the various nodes. By using a dedicated storage network, the burden from other networks such as an enterprise local area network (LAN) may be reduced. As a result, a SAN may provide centralized data management, thereby increasing data availability for a user.

In one embodiment, SAN 100 may include a server 102 connected to a server 104 via a switch 110. Servers 102 and 104 may include removable devices 106 and 108, respectively. Switch 110 may be connected to a storage appliance 112. Although FIG. 1 is shown with a limited number of nodes in a certain topology, it may be appreciated that system 100 may include more or less nodes in any type of topology as desired for a given implementation. The embodiments are not limited in this context.

It is worthy to note that although the embodiments may be described in the context of a wired communications system, the principles discussed herein may also be implemented in a wireless communications system as well. If implemented as a wireless system, one or more nodes shown in system 100 may further comprise additional components and interfaces suitable for communicating information signals over the designated RF spectrum. For example, servers 102 and 104 of SAN 100 may include omni-directional antennas, wireless RF transceivers, amplifiers, filters, control logic, and so forth. The embodiments are not limited in this context.

In one embodiment, SAN 100 may include switch 110. Switch 110 may be a communication switch to switch or route storage traffic between server 102, server 104 and storage appliance 112. An example of switch 110 may include a Gigabit Ethernet Switch. The embodiments, however, are not limited in this context.

In one embodiment, SAN 100 may include storage appliance 112. Storage appliance 112 may comprise a dedicated device to store data accessible by servers 102 and 104. Storage appliance 102 may include multiple memory storage devices, such as magnetic disc drives including hard drives, optical disc drives using compact discs (CD) or digital video discs (DVD), magnetic tape drives using magnetic tape, and so forth. In one embodiment, for example, storage appliance 102 may use a storage device such as a redundant array of independent disks (RAID) device. A RAID device may use multiple drives in combination for fault tolerance and performance. The embodiments are not limited in this context.

In one embodiment, SAN 100 may comprise servers 102 and 104. Servers 102 and 104 may be arranged to communicate storage traffic between each other, and to storage appliance 112, via switch 100. Servers 102 and 104 may include the appropriate network storage adapters and/or network interface cards to communicate with other devices in SAN 100.

In one embodiment, servers 102 and 104 may include removable devices 106 and 108, respectively. Removable devices 106 and 108 may comprise devices that may be added and removed from a system. Examples of a removable device may include network storage adapters, network interface cards, communication devices, video capture devices, disk caches, and so forth. In one embodiment, for example, removable devices 106 and 108 may each comprise a host bus adapter (HBA) to connect servers 102 and 104 to other devices in SAN 100. An example of a HBA may include an Intel® PRO/1000 T IP Gigabit Ethernet Storage Adapter made by Intel Corporation ("Intel Storage Adapter"). The Intel Storage Adapter may operate in accordance with the ISCSI Specification. The ISCSI Specification may enable the Transport Control Protocol (TCP) and Internet Protocol (IP) ("TCP/IP") to be used in a storage network and allow for the reuse of standard Ethernet cabling, equipment, and management tools. More particularly, the ISCSI Specification may be a protocol to encapsulate SCSI commands into TCP/IP packets and enable I/O block data transport over IP networks. The Intel Storage Adapter may be a removable device arranged for installation in a network-attached server and offloads TCP and ISCSI processing to the on-board Intel 80200 processor based on the Intel XScale™ microarchitecture. The Intel Storage Adapter may support standard protocols such as Ethernet and TCP/IP, for example. This may increase interoperability with similarly enabled devices. It may be appreciated that the Intel Storage Adapter is used as only one example of a removable device, and the embodiments are not limited in this context.

To allow servers 102 and 104 to operate with SAN 100, removable devices 106 and 108 may be added to servers 102 and 104, respectively. Once added to servers 102 and 104, each removable device may be arranged to automatically configure itself for operation with the host server and SAN 100. This is typically accomplished using embedded control software stored using an option ROM. The amount of non-volatile memory available to implement an option ROM, however, may be limited. Accordingly, one embodiment uses flash memory to implement an option ROM. Removable devices 106 and 108 and their corresponding option ROMs may be described in more detail with reference to FIGS. 2-4.

Figure 2:
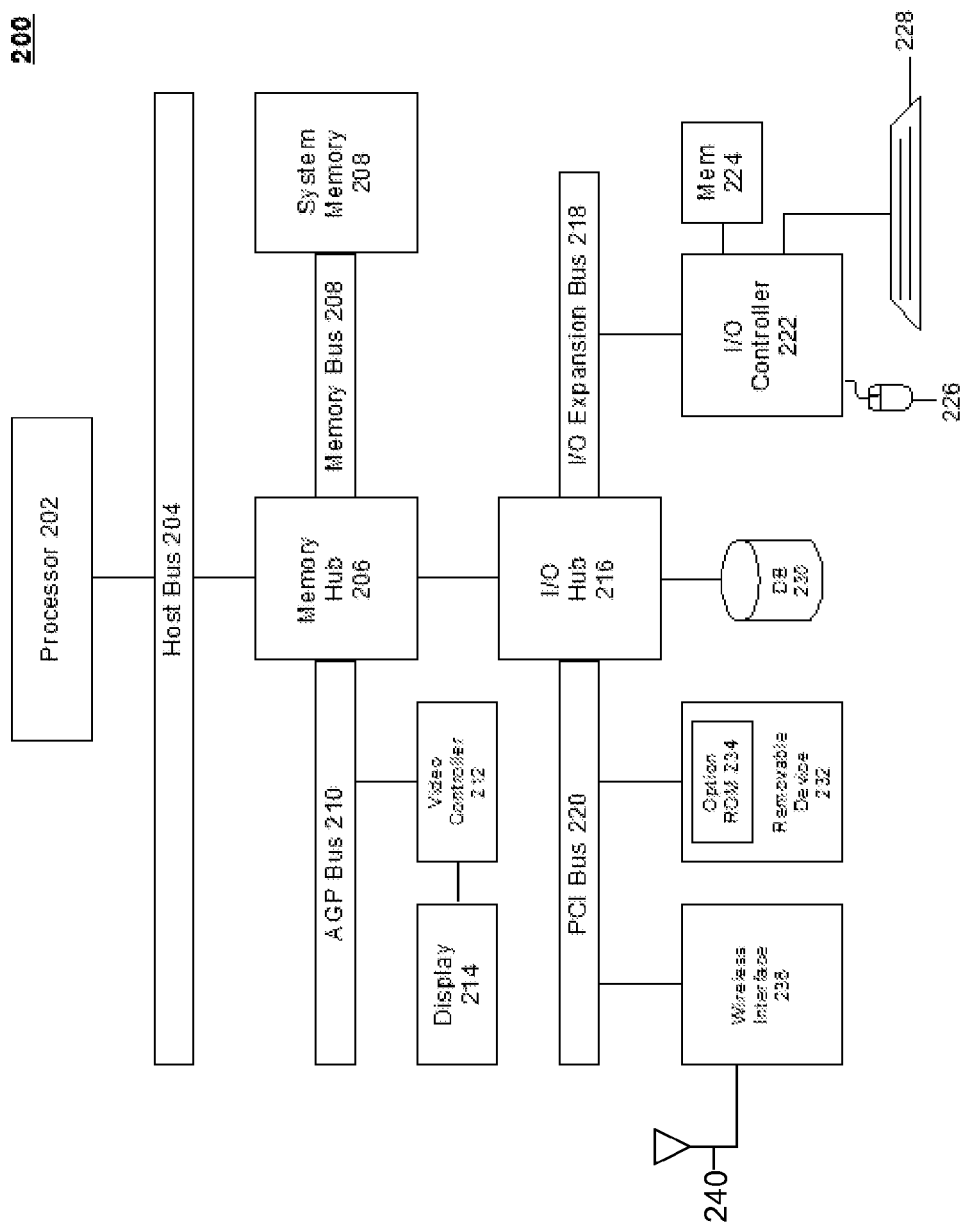
FIG. 2 illustrates a block diagram of a system 200.

FIG. 2 illustrates a block diagram of a system 200. System 200 may illustrate a processing system to operate with one or more nodes of SAN 100, such as servers 102 and 104, for example. In one embodiment, for example, system 200 may represent a processing system arranged to receive a removable device, such as removable devices 106 and 108. As shown in FIG. 2, processing system 200 may comprise multiple elements. Some elements may be implemented using, for example, one or more circuits, components, registers, processors, software subroutines, or any combination thereof. Although FIG. 2 shows a limited number of elements, it can be appreciated that more or less elements may be used in system 200 as desired for a given implementation. The embodiments are not limited in this context.

In one embodiment, processing system 200 may include a processor 202. Processor 202 may comprise a general-purpose or special-purpose processor such as a microprocessor, a microcontroller, an application specific integrated circuit (ASIC), a programmable gate array (PGA), and so forth. Processor 202 may be coupled over a host bus 204 to a memory hub 206. Memory hub 206 may be coupled to a system memory 208 via a memory bus 208. Memory hub 206 may also be coupled over an Advanced Graphics Port (AGP) bus 210 to a video controller 212, which may be coupled to a display 214. In one embodiment, for example, AGP bus 210 may conform to the Accelerated Graphics Port Interface Specification, Revision 2.0, published May 4, 1998, by Intel Corporation. The embodiments, however, are not limited in this context.

In one embodiment, memory hub 206 may also be coupled to an I/O hub 216 via a hub link 238. I/O hub 216 may be coupled to an I/O expansion bus 218. I/O hub 216 may also be coupled to a Peripheral Component Interconnect (PCI) bus 220. PCI bus 220 may comprise a bus as defined by the PCI Local Bus Specification, Production Version, Revision 2.1 dated June 1995, for example. I/O expansion bus 218 may be coupled to an I/O controller 222 that controls access to one or more I/O devices. The I/O devices may include storage devices such as a floppy disk drive 224, and input devices such as a mouse 226 and a keyboard 228. I/O hub 216 may also be coupled to, for example, a hard disk drive 230. Other storage media may also be included in the system as desired for a given implementation. In an alternate embodiment, I/O controller 222 may be integrated into I/O hub 216, as may other control functions. The embodiments are not limited in this context.

PCI bus 220 may be coupled to various components. For example, PCI bus 220 may be coupled to a network interface 236, which may be used to communicate with other devices. In one embodiment, network interface 236 may comprise a wireless network interface, and may include a dipole antenna 240, along with other wireless components such as a wireless transceiver, for example. Additional devices may be coupled to I/O expansion bus 218 and/or PCI bus 220, such as an I/O control circuit coupled to a parallel port, a serial port, a non-volatile memory, and so forth. The embodiments are not limited in this context.

In one embodiment, PCI bus 220 may be coupled to a removable device 232. Removable device 232 may include an option ROM 234. Option ROM 234 may assist in arranging removable device 232 for operation with a particular system or network, such as processing system 200 and/or SAN 100, for example. Option ROM 234 may comprise a non-volatile memory unit, such as a random access memory (RAM), programmable ROM (PROM), erasable PROM (EPROM), electronically EPROM (EEPROM), flash memory, and so forth. Option ROM 234 may store embedded control software. The embedded control software may include an initialization task module, which when executed may configure removable device 232 for use with processing system 200.

In one embodiment, removable device 232 may comprise an Intel Storage Adapter. Configuring removable device 232 to connect to an ISCSI target may need a relatively large amount of configuration information. Configuration information may include a desired set of configuration parameters for a component or device. The configuration information may be selected by a user, or automatically provided to the embedded control software via system 200. Examples of configuration information for the Intel Storage Adapter may include a target IP address, a port number, a target name, an initiator name, and so forth. The amount of configuration information for the Intel Storage Adapter, however, may be more than the capacity offered by traditional non-volatile memory, such as an EEPROM chip.

Accordingly, in one embodiment option ROM 234 may be implemented using flash memory to store embedded control software and configuration information for removable device 232. Flash memory may comprise a special type of EEPROM. Flash memory may comprise block-oriented or non-block-oriented flash memory. Block-oriented flash memory may be physically segmented into blocks, where any block can be individually erased and rewritten. A non-block-oriented flash memory is not physically segmented into blocks, and each byte can be individually erased and rewritten. One embodiment divides the entire flash memory area into virtual or logical blocks having a predefined size. The predefined size may vary according to a given implementation, although it may be advantageous to select a virtual block size to match a block-oriented flash memory, such as 512 bytes, for example. In this manner, configuration information may be stored in both block-oriented and non-block-oriented flash memory without necessarily having to change the virtual block size. The size of the virtual blocks, however, is not limited in this context.

In one embodiment, the embedded control software may comprise several modules, to include a task initialization module, a read configuration module, and a write configuration module. The task initialization module may be arranged to configure removable device 232 for operation with processing system 200. The read configuration module may be arranged to read configuration information from option ROM 234. The write configuration module may be arranged to write configuration information to option ROM 234. Option ROM 234 may be described in further detail with reference to FIGS. 3 and 4.

Figure 3:
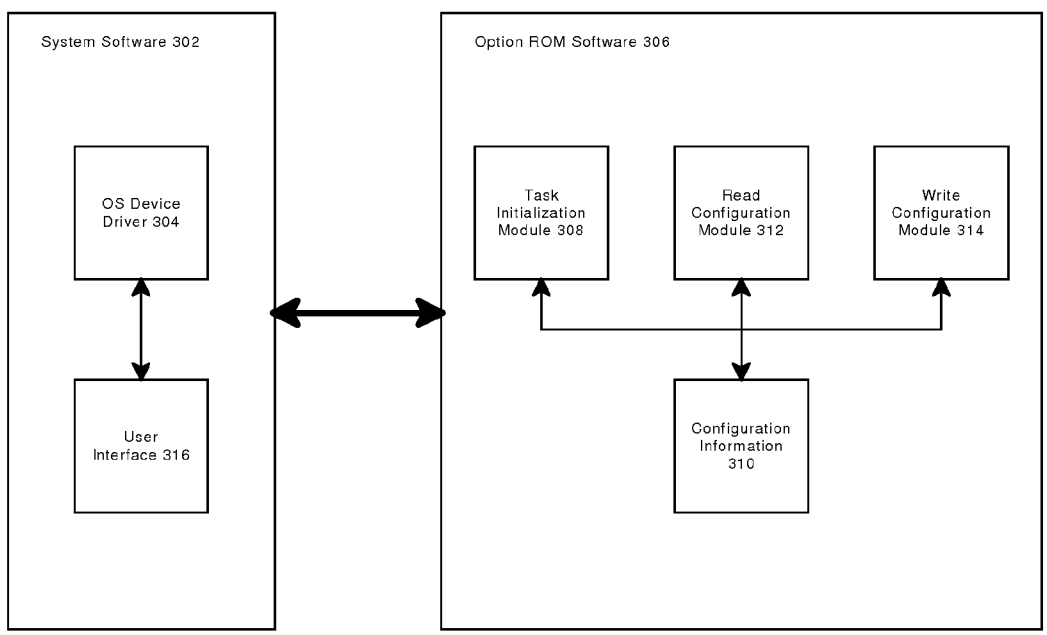
FIG. 3 illustrates a block diagram of a system 300.

FIG. 3 illustrates a block diagram of a system 300. System 300 may include system software 302 and option ROM software 306. System software 302 may be representative of, for example, the system software stored as part of system memory 208 of processing system 200. System software 302 may include, for example, operating system (OS) device driver 304 and user interface 316. System software 302 may also include a number of other components, such as an OS kernel, basis input/output system (BIOS), boot code, user interface, and so forth. Option ROM software 306 may be representative of, for example, the option ROM software stored as part of option ROM 234. Option ROM software 306 may comprise, for example, an initialization task module 308, configuration information 310, a read configuration module 312, and a write configuration module 314.

In general operation, portions of option ROM software 306 may interact with system software 302 to configure removable device 232 for operation with processing system 200 using configuration information 310 stored with option ROM software 306. Read configuration module 312 may read configuration information 310. Write configuration module 314 may write configuration information 310. In one embodiment, write configuration module 314 may be arranged to write configuration information 310 without necessarily erasing the entire flash memory device, as may occur in conventional flash memory techniques. To modify configuration information 310, a user may access configuration information 310 via user interface 316 of system software 302. The user may modify one or more configuration parameters for configuration information 310. Alternatively, OS device driver 304 of system software 302 may automatically modify the configuration parameters without user intervention. Although read configuration module 312 and write configuration module 314 are shown as part of option ROM software 306, it may be appreciated that these modules may be integrated with system software 302, and still fall within the scope of the embodiments. The embodiments are not limited in this context.

In one embodiment, the modified configuration information may be stored in option ROM 306 using one or more virtual blocks. Each byte in a flash memory device may be set to a value of 0xFF or 0x00. A byte set to a value of 0xFF can be changed to any value. A byte set to any value may be set to 0x00. These characteristics may be used to store configuration information 310 in the flash memory device. Once the image for the control software including the initialization task module is stored in the flash memory device, a certain amount of flash memory is allocated to store configuration information 310. The allocated area may be divided into virtual blocks having a predefined size. The allocated area divided into virtual blocks to store configuration information 310 may be referred to herein as "configuration storage blocks." The number of configuration storage blocks to store configuration information 310 may vary according to block size and the amount of configuration information. Configuration information 310 may include a signature string, configuration data, and a checksum for the configuration data. The signature string may comprise any unique identifier to indicate a start byte for the configuration data. An example of a signature string may include "$NVRAM$," although the embodiments are not limited in this context.

To read configuration data, read configuration module 312 may scan the virtual blocks for the signature string. If the signature string is found, the checksum may be used to check for errors in the configuration data. If the error-check is passed, the configuration data may be used by initialization task module 308 to initialize removable device 232.

To write configuration data, write configuration module 314 may reset the signature string block used to store the signature string. The signature string block may be reset by changing the value stored by the signature string block to 0x00. The configuration storage blocks after the reset signature string block are then scanned to determine if there are enough bytes set to 0xFF to store the signature string, configuration data, and checksum. If there are a sufficient number of bytes found during the scan, the signature string, configuration data and checksum may be written to the identified blocks. If there are not a sufficient number of bytes found during the scan, then the entire option ROM image may be read into a temporary memory buffer, the flash memory device may be erased, the option ROM image may be restored, and configuration information 310 may be written to the first block after the option ROM image end byte. This event should be rare, however, taking into account that the amount of configuration information 310 should be relatively small compared with the capacity of a given flash memory device.

Operations for the above systems may be further described with reference to the following figures and accompanying examples. Some of the figures may include programming logic. Although such figures presented herein may include a particular programming logic, it can be appreciated that the programming logic merely provides an example of how the general functionality described herein can be implemented. Further, the given programming logic does not necessarily have to be executed in the order presented unless otherwise indicated. In addition, the given programming logic may be implemented by a hardware element, a software element executed by a processor, or any combination thereof. The embodiments are not limited in this context.

Figure 4:
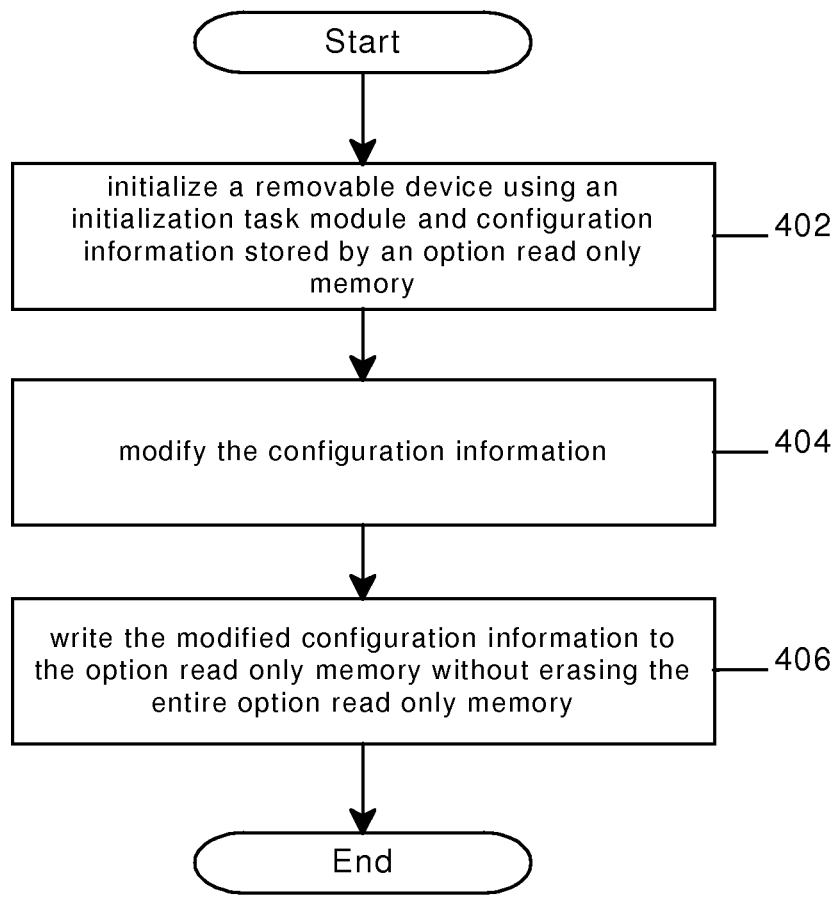
FIG. 4 illustrates a block diagram of a processing logic 400.

FIG. 4 illustrates a programming logic 400. Programming logic 400 may be representative of the operations executed by one or more systems described herein, such as systems 100-300. As shown in programming logic 400, a removable device may be initialized using an initialization task module and configuration information stored by an option ROM at block 402. The configuration information may be modified at block 404. The modified configuration information may be written to the option ROM without erasing the entire option ROM at block 406.

In one embodiment, the initialization at block 402 may be performed by reading the configuration information from the option ROM. The configuration information may be read by searching multiple blocks of the option ROM for a signature string. The configuration information and a checksum may be retrieved. Error checking may be performed for the configuration information using the checksum. The removable device may then be configured using the configuration information.

In one embodiment, the writing at block 406 may reset a signature string block storing the signature string to 0x00. A determination may be made as to a number of bytes needed to store the signature string, the modified configuration information, and a checksum for the modified configuration information. A determination may then be made as to whether there is a set of configuration storage blocks set to 0xFF after the signature string block with the number of bytes. The signature string, modified configuration information, and checksum may be written to the set of blocks for the option ROM if there are a sufficient number of blocks.

In one embodiment, there may not be a set of configuration blocks set to 0xFF after the signature string block with the appropriate number of bytes. In this case, the contents of the option ROM may be transferred to a temporary buffer. The temporary buffer may comprise, for example, system memory 208. The content may be erased from the option ROM. The content may be written from the temporary buffer to the erased option ROM, including the signature string, modified configuration information, and checksum to the set of blocks for the option ROM.

The operation of the above described systems and associated programming logic may be better understood by way of example. In one embodiment, reading and writing configuration information to option ROM 234 for removable device 232 may be implemented using software executed by a processor.

In one embodiment, for example, configuration may be read from option ROM 234 using a read configuration module. The read configuration module may scan all blocks after the end of an option ROM image for a signature string. When the signature string is found, the checksum is verified. If the checksum is valid, the configuration data may be returned to the caller. If the end of the flash memory device is reached without finding a signature string, however, it means that configuration information is not currently present in the flash memory device and this is indicated to the caller. An example of programming logic for the read configuration module may be provided as follows:

```
int Read_Cfg (Configuration_t* configuration)
    {int Offset, Found;
char sign[CONFIGURATION_SIGNATURE_LEN];
Offset=Get_Image_Size( );
If (Offset % BLOCK_LENGTH)
    Offset=(Offset / BLOCK_LENGTH+1) * BLOCK_LENGTH;
    Found=0;
while (!Found && Offset<FLASH_SIZE- sizeof(Configuration_t)) {
            read_flash(Offset,sign,-
                CONFIGURATION_SIGNATURE_LEN);
                if (strncmp(sign,-
                    CONFIGURATION_SIGNATURE,
                    CONFIGURATION_SIGNATURE_LEN)==0) {
            read_flash(Offset,configuration,sizeof(Configuration_t));
            Found=validate_crc(configuration);
            If (Found) currentOffset=Offset; }
            Offset+=BLOCK_LENGTH; }
    return(Found) }
```

In one embodiment, for example, configuration may be written to option ROM 234 using a write configuration module. The write configuration module erases a signature string block to 0x00, and attempts to find a suitable set of blocks for rewriting configuration after the erased signature string block. An example of programming logic for the write configuration module may be provided as follows:

```
int Write_Cfg(Configuration_t* configuration)
{Configuration_t tmpCfg,emptyCfg;
int Offset,Found;
char first,*Buf;
char sign[CONFIGURATION_SIGNATURE_LEN];
Prepare_Cfg(configuration);
        memset(emptyCfg,0xFF,sizeof(emptyCfg));
        if (Read_Cfg(tmpCfg)) {
        memset(sign,0, CONFIGURATION_SIGNATURE_LEN);
        write_flash(currentOffset,sign,CONFIGURATION_SIGNATURE_LEN);
        Offset=currentOffset+BLOCK_LENGTH; }
        Else {
        Offset= Get_Image_Size( );
        If (Offset % BLOCK_LENGTH !=0)
        Offset=(Offset/BLOCK_LENGTH+1)*BLOCK_LENGTH; }
        Found=0;
        while(!Found && Offset<FLASH_SIZE-sizeof(Configuration_t)) {
        read_flash(Offset,&first,1);
        if (first==0xFF) {
        read_flash(Offset,tmpCfg,sizeof(Configuration_t));
        Found=(memcmp(tmpCfg,emptyCfg,sizeof(tmpCfg))==0)}
```

```
    if (!Found) Offset+=BLOCK_LENGTH }
    if (Found) {write_flash(Offset,configuration,sizeof(configuration)) }
    else {
      Size=Get_Image_Size( );Buf=malloc(Size);read_flash(0,Buf,Size);
      erase_flash( ); write_flash(0, Buf, Size); free(Buf); Offset= Get_Image_Size( );
      If (Offset % BLOCK_LENGTH !=0)
            Offset=(Offset/BLOCK_LENGTH+1)*BLOCK_LENGTH;
               write_flash(Offset,configuration,sizeof(configuration)) }
    return(1) }
```

The read configuration module and write configuration module may use several subroutines. For example, the read configuration module may use a subroutine get_image_size( ) to calculate a length for an option ROM image by interpreting a PCI image header. The PCI image header typically contains the image length. In another example, the read configuration module may use a subroutine read_flash( ) to read flash data from specified offset to a buffer. This operation may copy data from a mapped flash region, and may require switching processor 202 into a protected mode to access this region. In another example, the write configuration module may use a subroutine write_flash( ) to write data from a buffer to flash memory. This operation may be implemented using the specific commands for a given flash memory device. In yet another example, the write configuration module may use a subroutine erase_flash( ) to erase the flash memory device. This operation may also be implemented using the specific commands for a given flash memory device.

In some embodiments, the same flash memory device may be used to store both the option ROM code and configuration data. It may be appreciated, however, that a separate flash memory device may also be used to store the configuration data. In this case, there may be no need for code save/restore operations when erasing the flash memory device. In the above-referenced pseudo-code, the call get_image_size( ) may be replaced with a zero (0) constant. The embodiments are not limited in this context.

In some embodiments, the flash memory device may comprise both block-oriented and non-block-oriented flash memory. If implemented using block-oriented flash memory, the flash erase process may be improved to operate without saving/restoring the option ROM code. In this case, the start of the configuration area can be aligned to flash physical block boundaries, and the configuration area may be erased on a block-by-block basis. This may be faster and more stable than saving/restoring the entire option ROM code. The embodiments are not limited in this context.

In some embodiments, there may be other non-volatile memory devices available for use in implementing an option ROM solution. For example, some implementations may include an EEPROM memory device that may be used to store a current configuration block number. In this case, the configuration information stored by the flash memory device may be located using the current configuration block number stored in the EEPROM, thereby obviating the need to scan for a signature string unless a previous configuration save operation was interrupted and the current configuration block number has been lost. The embodiments are not limited in this context.

Some embodiments may provide several advantages over conventional option ROM techniques. For example, consider the case where the configuration saving process is interrupted due to some external event such as a power loss. In conventional systems, such an event may cause loss of not only the configuration information but also the entire ROM image. In accordance with some embodiments, however, if such an event were to occur while erasing or rewriting block, the configuration information may be corrupted and read_cfg( ) will not find it next time. The embedded control software for the option ROM will detect a fault and require a user to re-enter a new set of configuration information. The re-entered configuration information may be saved in the first available configuration storage block. This technique may thereby reduce the need to re-install the entire option ROM image. Although some embodiments write the entire ROM image to a temporary (e.g., volatile) buffer when the number of configuration storage blocks are insufficient to store the configuration information, this should be a relatively rare event given the amount of memory space offered by flash memory relative to the amount of memory space needed to store configuration information.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a general-purpose or special-purpose processor. In another example, an embodiment may be implemented as dedicated hardware, such as a circuit, an ASIC, Programmable Logic Device (PLD) or digital signal processor (DSP), and so forth. In yet another example, an embodiment may be implemented by any combination of programmed general-purpose computer components and custom hardware components. The embodiments are not limited in this context.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus, comprising:
a removable device having an option read-only memory, said removable device to comprise an internet small computer system interface (ISCSI) compliant network storage adapter operable to perform transport control protocol (TCP) or ISCSI operations for another device, said option read-only memory to comprise a physical part of the ISCSI compliant network storage adapter, said option read-only memory to store an initialization task module and configuration information, said initialization task module to configure said removable device to operate with a system using said configuration information, with said configuration information to be modified and stored in said option read-only memory without erasing said entire option read-only memory.

2. The apparatus of claim 1, wherein said option read-only memory further comprises a read configuration module and a write configuration module, said read configuration module to read configuration information from said option read-only memory, and said write configuration module to write configuration information to said option read-only memory.

3. The apparatus of claim 2, wherein said write configuration module is to reset a signature string block, search for a number of available configuration storage blocks after said signature string block to store said configuration information, and write said configuration information to said available configuration storage blocks.

4. The apparatus of claim 2, wherein said read configuration module is to search multiple blocks of said option read-only memory for a signature string, retrieve said configuration information and a checksum, and perform error checking for said configuration information using said checksum.

5. The apparatus of claim 1, wherein said option read-only memory comprises flash memory.

6. A system, comprising:
a node having a processing system;
a removable device to connect with said processing system, said removable device having an option read-only memory, said removable device to comprise an internet small computer system interface (ISCSI) compliant network storage adapter operable to perform transport control protocol (TCP) or ISCSI operations for another device, said option read-only memory to comprise a physical part of the ISCSI compliant network storage adapter, said option read-only memory to store an initialization task module and configuration information, said initialization task module to configure said removable device to operate with a system using said configuration information, with said configuration information to be modified and stored in said option read-only memory without erasing said entire option read-only memory; and
a communications medium to connect to said removable device.

7. The system of claim 6, wherein said option read-only memory further comprises a read configuration module and a write configuration module, said read configuration module to read configuration information from said option read-only memory, and said write configuration module to write configuration information to said option read-only memory.

8. The system of claim 7, wherein said write configuration module is to reset a signature string block, search for a number of available configuration storage blocks after said signature string block to store said configuration information, and write said configuration information to said available configuration storage blocks.

9. The system of claim 7, wherein said read configuration module is to search multiple blocks of said option read-only memory for a signature string, retrieve said configuration information and a checksum, and perform error checking for said configuration information using said checksum.

10. The system of claim 6, wherein said option read-only memory comprises flash memory.

11. A method, comprising:
initializing a removable device using an initialization task module and configuration information stored by an option read-only memory, said removable device to comprise an internet small computer system interface (ISCSI) compliant network storage adapter operable to perform transport control protocol (TCP) or ISCSI operations for another device, said option read-only memory to comprise a physical part of the ISCSI compliant network storage adapter;
modifying said configuration information; and
writing said modified configuration information to said option read-only memory without erasing said entire option read-only memory.

12. The method of claim 11, wherein said initializing comprises:
reading said configuration information from said option read-only memory; and
configuring said removable device using said configuration information.

13. The method of claim 12, wherein said reading comprises:
searching multiple blocks of said option read-only memory for a signature string;
retrieving said configuration information and a checksum; and
performing error checking for said configuration information using said checksum.

14. The method of claim 11, wherein said writing comprises:
resetting a signature string block storing a signature string;
determining a number of bytes needed to store said signature string, said modified configuration information, and a checksum for said modified configuration information;
determining whether there is an available set of configuration storage blocks after said signature string block with said number of bytes; and
writing said signature string, said modified configuration information, and said checksum to said available set of configuration storage blocks for said option read-only memory in accordance with said determination.

15. The method of claim 14, wherein it is determined that said set of configuration blocks are unavailable, and said writing further comprises:
transferring contents of said option read-only memory to a temporary buffer;
erasing said contents from said option read-only memory;

writing said contents from said temporary buffer to said erased option read-only memory, including said signature string, said modified configuration information, and said checksum to said set of blocks for said option read-only memory.

16. An article, comprising:
a non-transitory storage medium;
said storage medium including stored instructions that, when executed by a processor, are operable to initialize a removable device using an initialization task module and configuration information stored by an option read-only memory, said removable device to comprise an internet small computer system interface (ISCSI) compliant network storage adapter operable to perform transport control protocol (TCP) or ISCSI operations for another device, modify said configuration information, and write said modified configuration information to said option read-only memory without erasing said entire option read-only memory.

17. The article of claim 16, wherein the stored instructions, when executed by a processor, perform said initializing using stored instructions operable to read said configuration information from said option read-only memory, and configure said removable device using said configuration information.

18. The article of claim 17, wherein the stored instructions, when executed by a processor, perform said reading using stored instructions operable to search multiple blocks of said option read-only memory for a signature string, retrieve said configuration information and a checksum, and perform error checking for said configuration information using said checksum.

19. The article of claim 16, wherein the stored instructions, when executed by a processor, perform said writing using stored instructions operable to reset a signature string block storing a signature string, determine a number of bytes needed to store said signature string, said modified configuration information, and a checksum for said modified configuration information, determine whether there is an available set of configuration storage blocks after said signature string block with said number of bytes, and write said signature string, said modified configuration information, and said checksum to said available set of configuration storage blocks for said option read-only memory in accordance with said determination.

20. The article of claim 19, wherein the stored instructions, when executed by a processor, determines that said set of configuration blocks are unavailable, and performs said writing using stored instructions operable to read contents of said option read-only memory to a temporary buffer, erase said contents from said option read-only memory, write said contents from said temporary buffer to said erased option read-only memory, including said signature string, said modified configuration information, and said checksum to said set of blocks for said option read-only memory.

* * * * *

UNITED STATES PATENT AND TRADEMARK OFFICE
CERTIFICATE OF CORRECTION

| | | |
|---|---|---|
| PATENT NO. | : 8,667,214 B2 | Page 1 of 1 |
| APPLICATION NO. | : 13/677845 | |
| DATED | : March 4, 2014 | |
| INVENTOR(S) | : Timofey V. Kutergin et al. | |

It is certified that error appears in the above-identified patent and that said Letters Patent is hereby corrected as shown below:

On the title page, in item (63), in column 1, line 2, delete "2006." and insert -- 2006, which is a national stage application claiming benefit of and priority to international PCT/RU2004/000280 filed Jul. 16, 2004 --, therefor.

Signed and Sealed this
Nineteenth Day of August, 2014

Michelle K. Lee
*Deputy Director of the United States Patent and Trademark Office*